US012233818B2

(12) United States Patent
Kapur et al.

(10) Patent No.: US 12,233,818 B2
(45) Date of Patent: Feb. 25, 2025

(54) STAIR SYSTEM FOR VEHICLE

(71) Applicant: Opus Mach LLC, Naperville, IL (US)

(72) Inventors: Deepak Kapur, Naperville, IL (US); David Bruford, Shelby Township, MI (US); Aleyna Kapur, Dearborn, MI (US); Robert Grinstead, Chisago City, MN (US); Roman Kapur, Naperville, IL (US); Ashlon Lionel Frank, Mangalore (IN); Yash Rajeev Banka, Mumbai (IN); Michelle Murray, Greenlawn, NY (US); Zihui Lin, Guangdong (CN); Ambar Ratan Kakkar, New Delhi (IN); Yi Zhao, Shanghai (CN)

(73) Assignee: Opus Mach LLC, Naperville, IL (US)

( * ) Notice: Subject to any disclaimer, the term of this patent is extended or adjusted under 35 U.S.C. 154(b) by 274 days.

(21) Appl. No.: 18/081,182

(22) Filed: Dec. 14, 2022

(65) Prior Publication Data
US 2023/0114575 A1 Apr. 13, 2023

Related U.S. Application Data

(63) Continuation-in-part of application No. 17/453,687, filed on Nov. 5, 2021, now Pat. No. 11,951,947.

(60) Provisional application No. 63/109,921, filed on Nov. 5, 2020.

(51) Int. Cl.
*B60R 3/02* (2006.01)
(52) U.S. Cl.
CPC ..................... *B60R 3/02* (2013.01)

(58) Field of Classification Search
CPC ................................ B60R 3/02; E06C 5/02
See application file for complete search history.

(56) References Cited

U.S. PATENT DOCUMENTS

| 3,796,456 | A | * | 3/1974 | Bergeson | B60R 3/02 296/156 |
| 3,997,211 | A | * | 12/1976 | Graves | B60R 3/02 182/116 |
| 4,347,638 | A | * | 9/1982 | Weaver | B60R 3/02 182/115 |
| 4,720,116 | A | * | 1/1988 | Williams | B60R 3/02 182/127 |

(Continued)

*Primary Examiner* — Jeffrey J Restifo
(74) *Attorney, Agent, or Firm* — Harness, Dickey & Pierce, P.L.C.

(57) ABSTRACT

A stair system for providing access to a cargo platform of a commercial vehicle is disclosed. The stair system is movable between a deployed configuration and a stowed configuration. The stair system comprises a mounting plate, a stair assembly, and a linkage assembly. The mounting plate is configured to be attached to the cargo platform of the commercial vehicle. The stair assembly includes a top platform that is slidably received within the mounting plate and a plurality of step platforms that is pivotally attached to the top platform. The linkage assembly comprising at least one slotted link that includes a slot and at least one first link that is slidable relative to the slot. When in the stowed configuration, the stair system is configured to be positioned beneath the cargo platform. When in the deployed configuration, the stair system is configured to extend outwardly from the cargo platform.

22 Claims, 13 Drawing Sheets

(56) References Cited

U.S. PATENT DOCUMENTS

| | | | | |
|---|---|---|---|---|
| 5,064,023 A * | 11/1991 | Loeber | E06C 5/02 | 182/127 |
| 5,228,707 A * | 7/1993 | Yoder | B60R 3/02 | 182/127 |
| 5,617,930 A * | 4/1997 | Elia | B60R 3/02 | 296/62 |
| 5,887,540 A * | 3/1999 | Krish, Jr. | B63B 27/14 | 114/362 |
| 6,029,775 A * | 2/2000 | Hedley | B60R 3/02 | 182/127 |
| 6,058,875 A * | 5/2000 | Krish, Jr. | E06C 5/02 | 114/362 |
| 6,068,277 A * | 5/2000 | Magnussen | B60R 3/02 | 182/127 |
| 6,264,222 B1 * | 7/2001 | Johnston | B60R 3/02 | 182/127 |
| 6,401,861 B1 * | 6/2002 | Marszalek | E06C 9/08 | 182/86 |
| 7,025,174 B1 * | 4/2006 | Hawley | B60R 3/02 | 182/127 |
| 7,168,722 B1 * | 1/2007 | Piotrowski | B60R 3/02 | 280/166 |
| 7,240,947 B2 | 7/2007 | Kuznarik | B62D 33/0273 | 296/62 |
| 7,469,915 B2 * | 12/2008 | Horn | B60R 3/02 | 182/86 |
| 8,931,792 B1 * | 1/2015 | Klassen | B60R 3/02 | 182/67.4 |
| 9,308,869 B1 * | 4/2016 | Owens, Jr. | E04G 1/28 | |
| 9,487,148 B2 * | 11/2016 | Kichline, Jr. | B60R 3/02 | |
| D937,730 S * | 12/2021 | Hamilton | D12/203 | |
| 11,951,947 B2 * | 4/2024 | Kapur | B60R 3/02 | |
| 12,090,960 B2 * | 9/2024 | Ronsen | B60R 3/02 | |
| 2003/0127284 A1 * | 7/2003 | Cook | E06C 9/08 | 182/86 |
| 2006/0006023 A1 * | 1/2006 | Lim | B60R 3/02 | 182/127 |
| 2006/0261623 A1 * | 11/2006 | Kuznarik | B60R 3/02 | 296/62 |
| 2008/0202852 A1 * | 8/2008 | Zsido | E06C 1/381 | 182/129 |
| 2009/0065301 A1 * | 3/2009 | Ellement | E02F 9/0833 | 182/127 |
| 2010/0181741 A1 * | 7/2010 | Webb | B60R 3/02 | 280/166 |
| 2012/0312825 A1 * | 12/2012 | Kennedy | B60R 3/02 | 220/660 |
| 2013/0193667 A1 * | 8/2013 | Ellement | E02F 9/0833 | 280/166 |
| 2014/0239609 A1 * | 8/2014 | Robertson | B60R 3/02 | 280/166 |
| 2017/0158108 A1 * | 6/2017 | Elbaz | B60P 3/0255 | |
| 2017/0246992 A1 * | 8/2017 | Giesmann | E06C 5/24 | |
| 2018/0313151 A1 * | 11/2018 | Ellement | E06C 5/14 | |
| 2019/0351832 A1 * | 11/2019 | Fuller | E06C 5/36 | |
| 2022/0134957 A1 * | 5/2022 | Kapur | B60Q 9/008 | 280/164.1 |
| 2023/0100518 A1 * | 3/2023 | Denz | B60R 3/02 | 182/97 |
| 2023/0114575 A1 * | 4/2023 | Kapur | B60R 3/02 | 280/163 |
| 2023/0415654 A1 * | 12/2023 | Lade | B60R 3/02 | |
| 2024/0270174 A1 * | 8/2024 | Magni | B66F 9/0655 | |
| 2024/0336202 A1 * | 10/2024 | Longest | B60R 3/02 | |

\* cited by examiner

STAIR SYSTEM FOR VEHICLE

CROSS-REFERENCE TO RELATED APPLICATIONS

This application is a continuation-in-part of U.S. patent application Ser. No. 17/453,687 filed on Nov. 5, 2021. This application claims the benefit of U.S. Provisional Application No. 63/109,921, filed on Nov. 5, 2020. The entire disclosure of each of the above applications is incorporated herein by reference.

FIELD

The present disclosure relates to a stair system for a vehicle and, more particularly, to a stair system for providing access to a cargo area of a commercial vehicle.

BACKGROUND

This section provides background information related to the present disclosure and is not necessarily prior art.

Some vehicles such flatbed trucks and flatbed trailers, for example, include a cargo area for stowing cargo to be transported by the vehicle. Step ladders or other similar equipment may be necessary for accessing the cargo area. These apparatus may, themselves, need to be stowed in or on the vehicle and, therefore, may necessarily occupy storage space in the cargo area, for example, or other spaces of the vehicle. Additionally, such apparatus may be separable from the vehicle and may become misplaced or otherwise unavailable for use when needed.

SUMMARY

This section provides a general summary of the disclosure, and is not a comprehensive disclosure of its full scope or all of its features.

The present disclosure provides a stair system for providing access to a cargo platform of a commercial vehicle. The stair system is movable between a deployed configuration and a stowed configuration. The stair system comprises a mounting plate, a stair assembly, and a linkage assembly. The mounting plate is configured to be attached to the cargo platform of the commercial vehicle. The mounting plate includes a backwall and a pair of sidewalls that extend from the backwall. The stair assembly includes a top platform slidably received within the mounting plate and a plurality of step platforms pivotally attached to the top platform. The linkage assembly comprising at least one slotted link and at least one first link. The slotted link is attached to one sidewall of the mounting plate. The slotted link includes a slot that extends between a first link end and a second link end. The first link is disposed on one lateral side of the stair assembly. The first link includes a third link end that is slidable relative to the slot and a fourth link end that is pivotally attached to the stair assembly. When in the stowed configuration, the stair system is configured to be positioned beneath the cargo platform. When in the deployed configuration, the stair system is configured to extend outwardly from a side of the cargo platform.

In some configurations of the stair system of the above paragraph, at least one handle is pivotally attached to the stair assembly on one lateral side of the stair assembly. The handle includes a handrail and a first connecting bar. The first connecting bar is pivotally attached to the handrail at a first bar end and pivotally attached to the stair assembly at a second bar end.

In some configurations of the stair system of either of the above paragraphs, when the stair system moves between the stowed configuration and the deployed configuration, the stair assembly and the at least one handle move concurrently.

In some configurations of the stair system of any of the above paragraphs, the handle further includes a second connecting bar that is pivotally attached to the handrail at a third bar end and pivotally attached to the stair assembly at a fourth bar end. The second connecting bar is spaced from the first connecting bar.

In some configurations of the stair system of any of the above paragraphs, the stair assembly includes at least one connecting member disposed on one lateral side of the plurality of step platforms.

In some configurations of the stair system of any of the above paragraphs, the connecting member extends between a first member end and a second member end that opposes the first member end. The connecting member is pivotally attached to the top platform at the first member end.

In some configurations of the stair system of any of the above paragraphs, the second bar end of the first connecting bar of the handle is pivotally attached to the connecting member at the first member end.

In some configurations of the stair system of any of the above paragraphs, the linkage assembly comprises a pair of slotted links attached to the pair of sidewalls of the mounting plate and a pair of first links disposed on opposing lateral sides of the stair assembly. The at least one handle includes a pair of handles pivotally attached to the stair assembly on opposing lateral sides of the stair assembly.

The present disclosure also provides a stair system attached to a cargo platform of a vehicle and movable between a deployed configuration providing access to a storage area of the cargo platform and a road-ready stowed configuration. The stair system comprises a mounting plate, a stair assembly, a pair of handles, and a linkage assembly. The mounting plate is configured to be attached to the cargo platform of the vehicle. The mounting plate includes a backwall and a pair of sidewalls that extend from the backwall. The stair assembly includes a top platform that is slidably received within the mounting plate and a plurality of step platforms that is pivotally attached to the top platform. The pair of handles is pivotally attached to the stair assembly on opposing sides of the stair assembly. Each handle includes a handrail and a first connecting bar that is attached to the handrail at a first bar end and attached to the stair assembly at a second bar end. The linkage assembly comprises a pair of slotted links and a pair of first links. The pair of slotted links is attached to the backwall of the mounting plate. Each slotted link includes a slot that extends between a first link end and a second link end. The pair of first links is disposed on opposing sides of the stair assembly. Each first link includes a third link end that is slidable relative to the slot and a fourth link end that is pivotally attached to the stair assembly. When in the road-ready stowed configuration, the stair system is configured to be positioned beneath the cargo platform. When in the deployed configuration, the stair system is configured to extend outwardly from a side of the cargo platform.

In some configurations of the stair system of the above paragraph, the first link end of the slot is positioned adjacent to the backwall of the mounting plate.

In some configurations of the stair system of either of the above paragraphs, the first link is positioned at the first link end of the slot when the stair system is in the stowed configuration.

In some configurations of the stair system of any of the above paragraphs, the first link is positioned at the second link end of the slot when the stair system is in the deployed configuration.

In some configurations of the stair system of any of the above paragraphs, the first link is rotatably attached to the top platform between the third and fourth link ends.

In some configurations of the stair system of any of the above paragraphs, the linkage assembly further comprises a pair of second links disposed on opposing sides of the stair assembly. Each second link extends between a fifth link end that is pivotally attached to the fourth link end of the first link and a sixth link end that is pivotally attached to the stair assembly.

In some configurations of the stair system of any of the above paragraphs, each handle includes a second connecting bar that is pivotally attached to the handrail at a third bar end and pivotally attached to the stair assembly at a fourth bar end. The second connecting bar is spaced from the first connecting bar.

In some configurations of the stair system of any of the above paragraphs, the sixth link end of the second link is fixedly attached to the fourth bar end of the second connecting bar.

In some configurations of the stair system of any of the above paragraphs, a linear actuator includes a housing, a rod and a motor. The rod is received in the housing and the motor drives the rod to slidably move relative to the housing.

In some configurations of the stair system of any of the above paragraphs, the housing is attached to the backwall of the mounting plate and the rod is attached to the stair assembly.

In some configurations of the stair system of any of the above paragraphs, when the rod extends relative to the housing, the stair system moves into the deployed configuration and when the rod retracts relative to the housing, the stair system moves into the stowed configuration.

The present disclosure also provides a commercial vehicle comprising a passenger cab, a cargo platform and a stair system. The cargo platform is located rear of the passenger cab. The cargo platform comprises an upper side, an underside, a side rail and a cargo storage area. The stair system is attached to the cargo platform and movable between a deployed configuration and a stowed configuration. The stair system comprises a mounting plate, a stair assembly, a pair of handles, a linkage assembly, and a linear actuator. The mounting plate is configured to be attached to the cargo platform of the commercial vehicle. The mounting plate includes a backwall and a pair of sidewalls that extend from the backwall. The stair assembly includes a top platform slidably received within the mounting plate and a plurality of step platforms pivotally attached to the top platform. The pair of handles is pivotally attached to the stair assembly on opposing sides of the stair assembly. Each handle includes a handrail and a first connecting bar that is attached to the handrail at a first bar end and attached to the stair assembly at a second bar end. The linkage assembly comprises a pair of slotted links, a pair of first links, and a pair of second links. The pair of slotted links is attached to the backwall of the mounting plate. Each slotted link includes a slot that extends between a first link end and a second link end. The pair of first links is disposed on opposing sides of the stair assembly. Each first link includes a third link end that is slidable relative to the slot and a fourth link end that is pivotally attached to the stair assembly. The pair of second links disposed on opposing sides of the stair assembly. Each second link extends between a fifth link end that is pivotally attached to the fourth link end of the first link and a sixth link end that is pivotally attached to the stair assembly. The linear actuator includes a housing, a rod and a motor. The rod is received in the housing and the motor drives the rod to slidably move relative to the housing. When in the stowed configuration, the stair system is configured to be positioned beneath the cargo platform. When in the deployed configuration, the stair system is configured to extend outwardly from a side of the cargo platform.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

With reference to the figures, a stair system is illustrated that can be integrated with a cargo platform of a vehicle, such as a commercial for transporting goods (e.g., a flatbed truck, a pick-up truck, a flatbed trailer or the like. The stair system is attached to the vehicle and/or the cargo platform and provides a user/operator with easy and safe access to the cargo platform. The stair system can be arranged in a deployed configuration when in use and in a stowed configuration that is road-ready. The stair system does not occupy the storage space provided by the cargo platform.

With initial reference to FIGS. 1-9, a stair system 110 according to the present disclosure is described. The stair system 110 can be integrated with a cargo platform 116 of a vehicle 112, such as a commercial for transporting goods (e.g., a flatbed truck, a pick-up truck, a flatbed trailer or the like. The stair system 110 can be attached to the vehicle 112 and/or the cargo platform 116 and provides a user/operator with easy and safe access to the cargo platform 116. The stair system 110 can be arranged in a deployed configuration (FIG. 5) when in use and in a stowed configuration (FIG. 6) that is road-ready. The stair system 110 does not occupy the storage space provided by the cargo platform 116.

Figure 6:
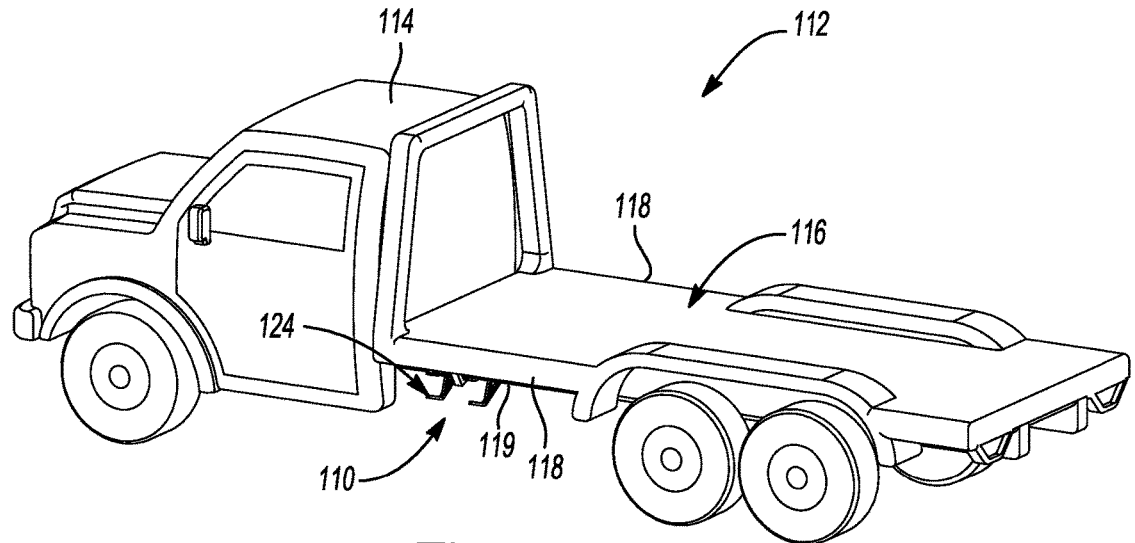
FIG. 6 is a perspective view of the flatbed truck shown in FIG. 5 and showing the stair system in a stowed configuration.
Figure 5:
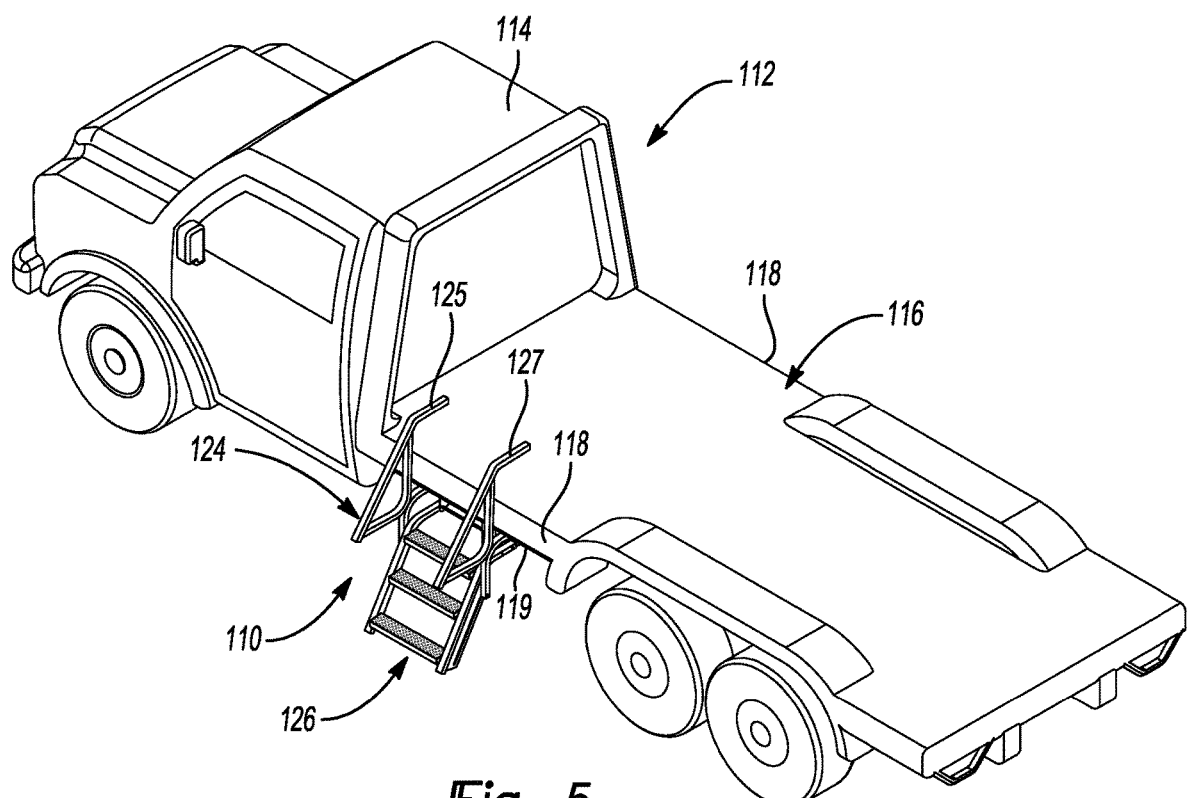
FIG. 5 is a perspective view of a flatbed truck incorporating a stair system according to FIG. 1 of the present disclosure and showing the stair system in a deployed configuration.

As illustrated in FIGS. 5 and 6, the cargo platform 116 may be located rear of a cab 114 of the vehicle 112. The cargo platform can have side rails or sides 118 extending along a length of the cargo platform 116 between forward and rear ends of the cargo platform 116. The stair system 110 may be attached to an underside or lower surface 119 of the cargo platform 116 and/or at one of the side rails or sides 118.

With referenced to FIGS. 1-4, the stair system 110 may include one or more mounting brackets 122, a handle assembly 124, a stair assembly 126 and (optionally) a motor assembly 129.

The mounting brackets 122 may be J-shaped channel and may be made of a metal material. The mounting brackets 122 may be spaced apart from each other and fixedly mounted to the underside 119 of the cargo platform 116 and/or to a side rail 118 of the cargo platform 116. Each mounting bracket 122 may include a first wall 128, a second wall 130 and a third wall 132 that cooperate to form a cavity 134. Each first wall 128 of the mounting brackets 122 may define the outer lateral boundaries of the stair system 110. The first and second walls 128, 130 may extend parallel to each other and perpendicular to the third wall 132. The handle assembly 124 may be pivotally coupled to the first walls 128 of the mounting brackets 122 at pivot locations 121. The stair assembly 126 may be pivotally coupled to the second walls 130 of the mounting brackets 122 at pivot locations 123. In some configurations, the second wall 130 may also be coupled to the motor assembly 129. The third wall 132 may be fixedly mounted (e.g., welded) to the cargo platform 116. In some configurations, fasteners (not shown) may extend through apertures (not shown) in the third wall 132 to fixedly mount the mounting brackets 122 to the lower surface 119 of the cargo platform 116 and/or to the side rail 118. Alternatively, the mounting brackets 122 can be attached to the lower surface 119 of the cargo platform 116 and/or to the side rail 118, e.g., by welding.

The handle assembly 124 includes first and second handles 125, 127. Each handle 125, 127 may be made of a metal material. In some configurations, each handle 125, 127 may be made of a polymer or composite material, for example. Each handle 125, 127 may include a first connecting bar 138, a second connecting bar 140 and a hand rail 142.

With continued reference to FIGS. 1-4, the first connecting bar 138 can be V or U shaped and can include a first arm 144, a second arm 146 and an arcuate middle portion 149. An inner end of the first arm 144 extends from a first end of the middle portion 149 and an outer end of the first arm 144 is coupled (e.g., connected or fixed) to the gripping bar 142. An inner end of the second arm 146 extends from a second end of the middle portion 149 and an outer end of the second arm 146 is coupled to the gripping bar 142.

The second connecting bar 140 can be V or U shaped and can include a first arm 158, a second arm 160 and an arcuate middle portion 162. An inner end of the first arm 158 extends from a first end of the middle portion 162 and an outer end of the first arm 158 is coupled to the stair assembly 126 by the pin 183. An inner end of the second arm 160 extends from a second end of the middle portion 162 and an outer end of the second arm 160 is received in a cavity 134 of a respective mounting bracket 122. The second arm 160 is rotatably or pivotally coupled to the first wall 128 of a respective mounting bracket 122, e.g., via a pivot pin, at the pivot location 121. The middle portion 162 of the second connecting bar 140 is fixed (e.g., via threaded fasteners, welding or any other suitable method) to the middle portion 149 of the first connecting bar 138.

The hand rail 142 may be rectangular-shaped and hollow to reduce the weight of the stair system 110. In some configurations, however, the hand rail 142 may be solid and cylindrically-shaped, for example. The hand rail 142 may be attached (e.g., fastened or welded) to the first connecting bar 138 and may include an inclined portion 172 and a horizontal portion 174. The inclined portion 172 may extend at an angle relative to the horizontal portion 174 and may be attached to the first connecting bar 138 at different locations. That is, a lower end 176 of the inclined portion 172 may be attached to the outer end of the second arm 146 of the first connecting bar 138, and an upper end 178 of the inclined portion 172 may be attached to the outer end of the first arm 138 of the first connecting bar 138. The horizontal portion 174 of the hand rail 142 extends horizontally and at least partially over the cargo platform 116 when the stair system 110 is in the deployed configuration. In this way, a user/operator of the stair system 110 can step from the stair assembly 126 directly onto the cargo platform 116, and can conveniently and naturally grasp the horizontally extended horizontal portion 174 of the hand rail 142 for support and stability. The horizontal portion 174 of the hand rail 142 is located at least partially beneath the cargo platform 116 and/or the side rail 118 when the stair system 110 is in the stowed configuration.

The stair assembly 126 may be made of a metal material and may include a plurality of step platforms 150 and two opposing rail mechanisms 148, each located at an opposite lateral side of the step platforms 150. Each rail mechanism 148 is pivotally attached to a respective mounting bracket 122 at the pivot location 123 and includes a rail 154, a connecting member 157 and an rail plate 156. The rail 154 may be rectangular-shaped and hollow to reduce the weight of the stair system 110. In some configurations, the rail 154 may be solid and cylindrically-shaped, for example. The rail 154 may be attached (e.g., welded) to the rail plate 156. A first end of the connecting member 157 may be attached (e.g., welded) to the rail 154 and a second end of the connecting member 157 may be pivotally attached to the second wall 130 of the respective mounting bracket 122 at the pivot location 123. The rail plate 156 may include an elongated slot 170 formed therein. The slot 170 may be at a lower portion of the rail plate 156 and may extend between opposing ends of the rail plate 156. A pin 183 may extend through the first arm 158 and into the slot 170 to thereby couple the handle assembly 124 to the stair assembly 126.

The step platforms 150 may be attached (e.g., welded) to and extend between the rails 154. The step platforms 150 may be offset from one another such that a user/operator may conveniently traverse the step platforms 150 when ascending and/or descending the stair assembly 126.

Figure 1:
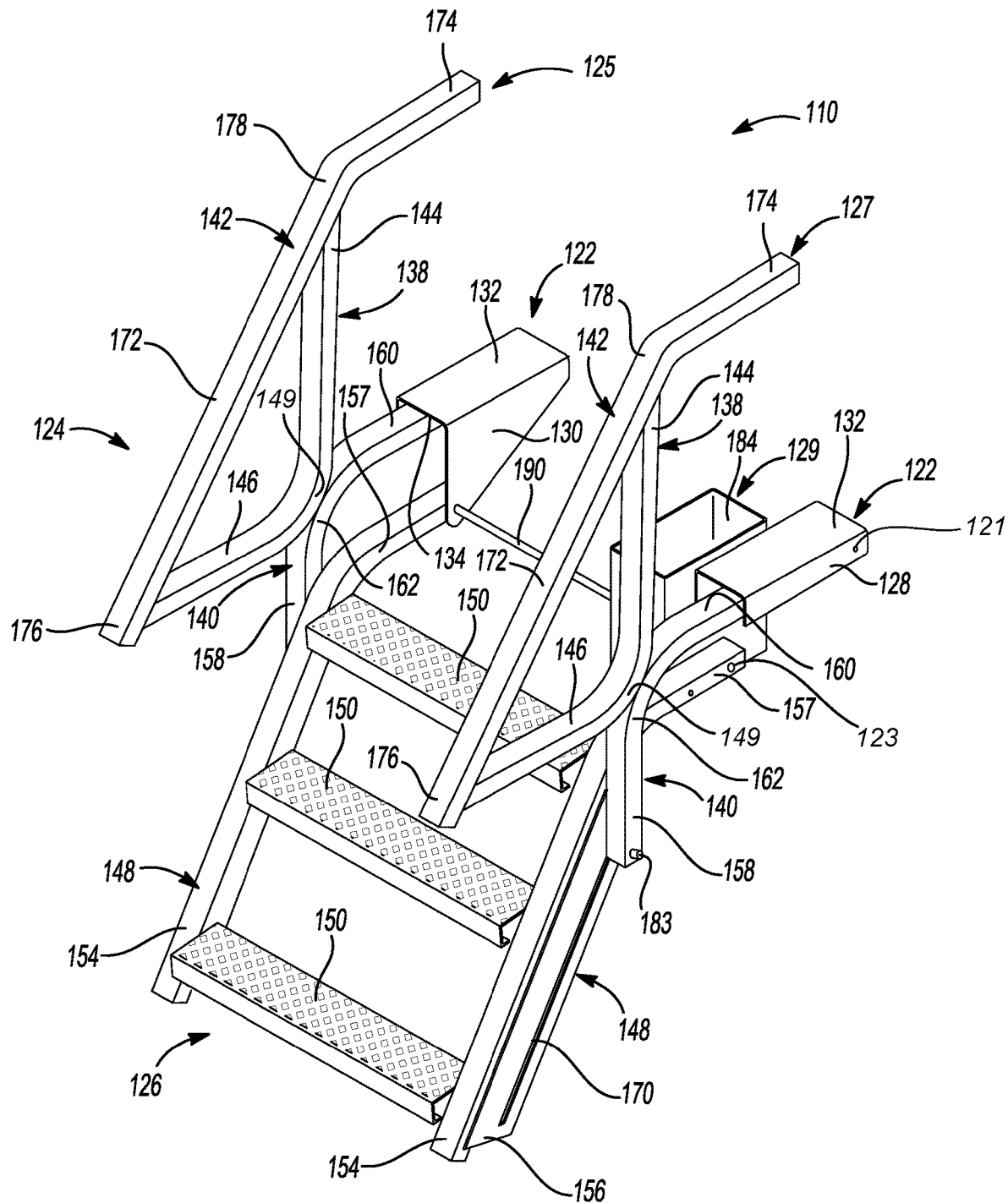
FIG. 1 is a front-right perspective view of the stair system according to the present disclosure.
Figure 2:
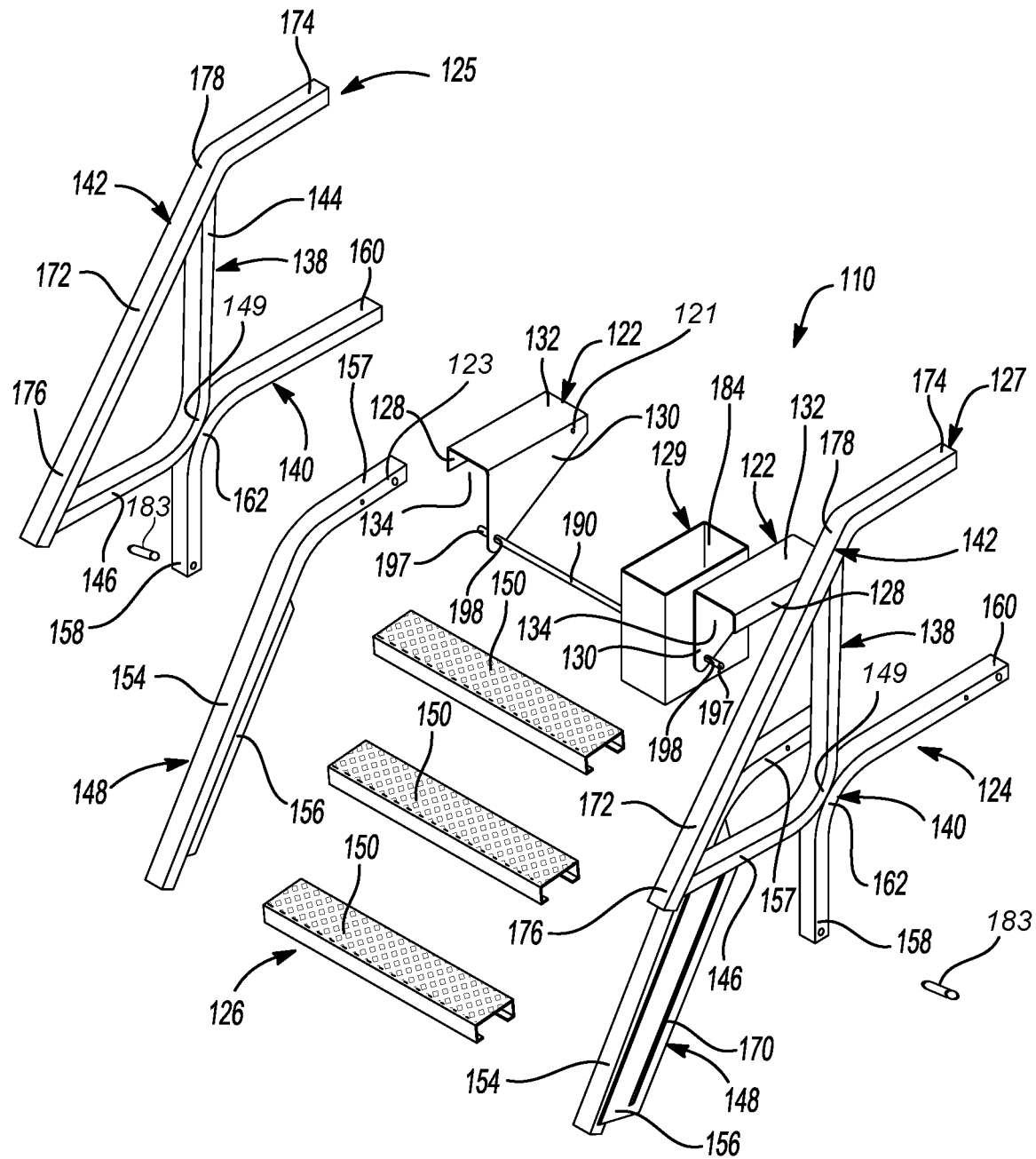
FIG. 2 is an exploded perspective view of the stair system shown in FIG. 1.
Figure 3:
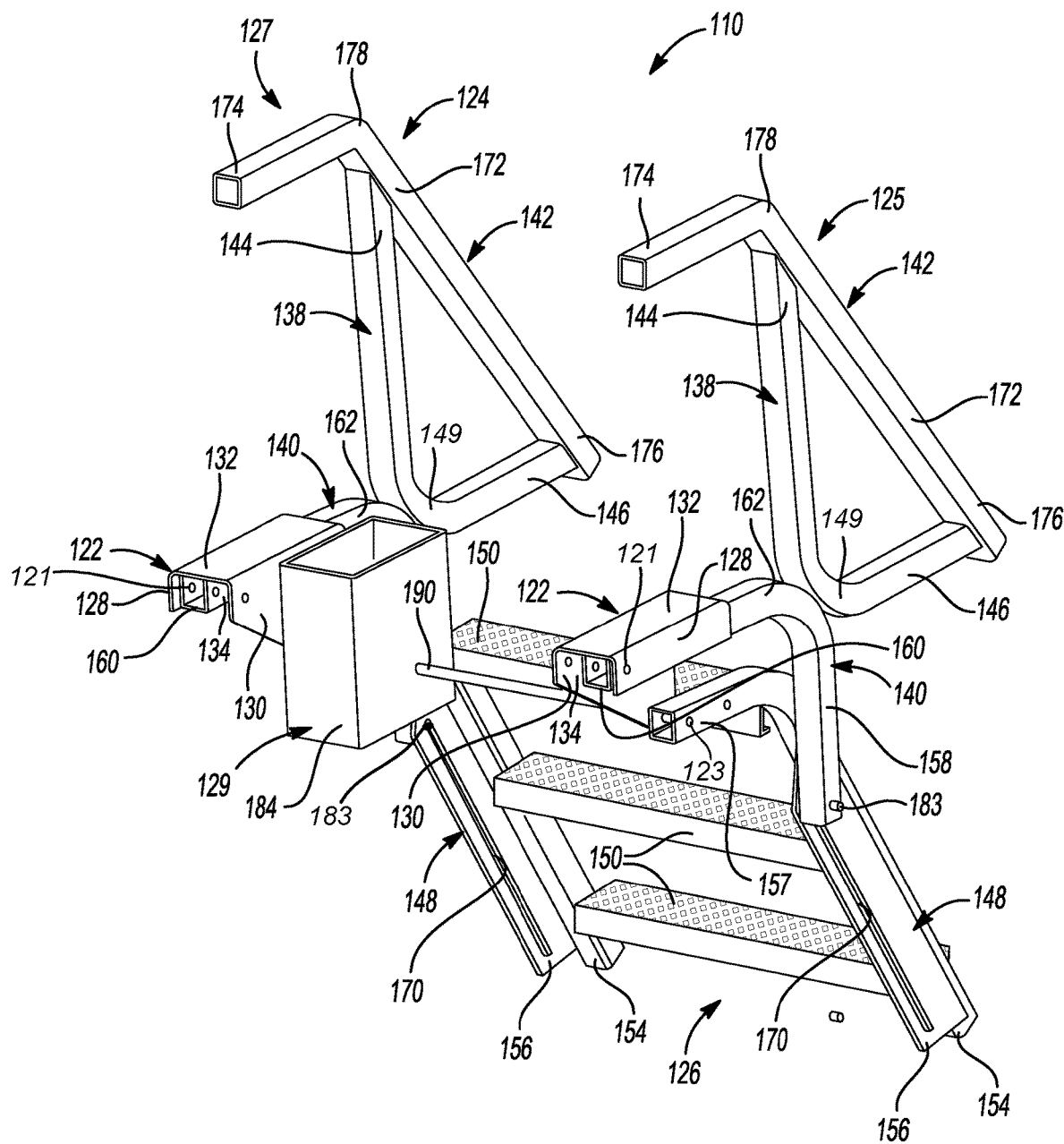
FIG. 3 is back-left perspective view of the stair system shown in FIG. 1.
Figure 4:
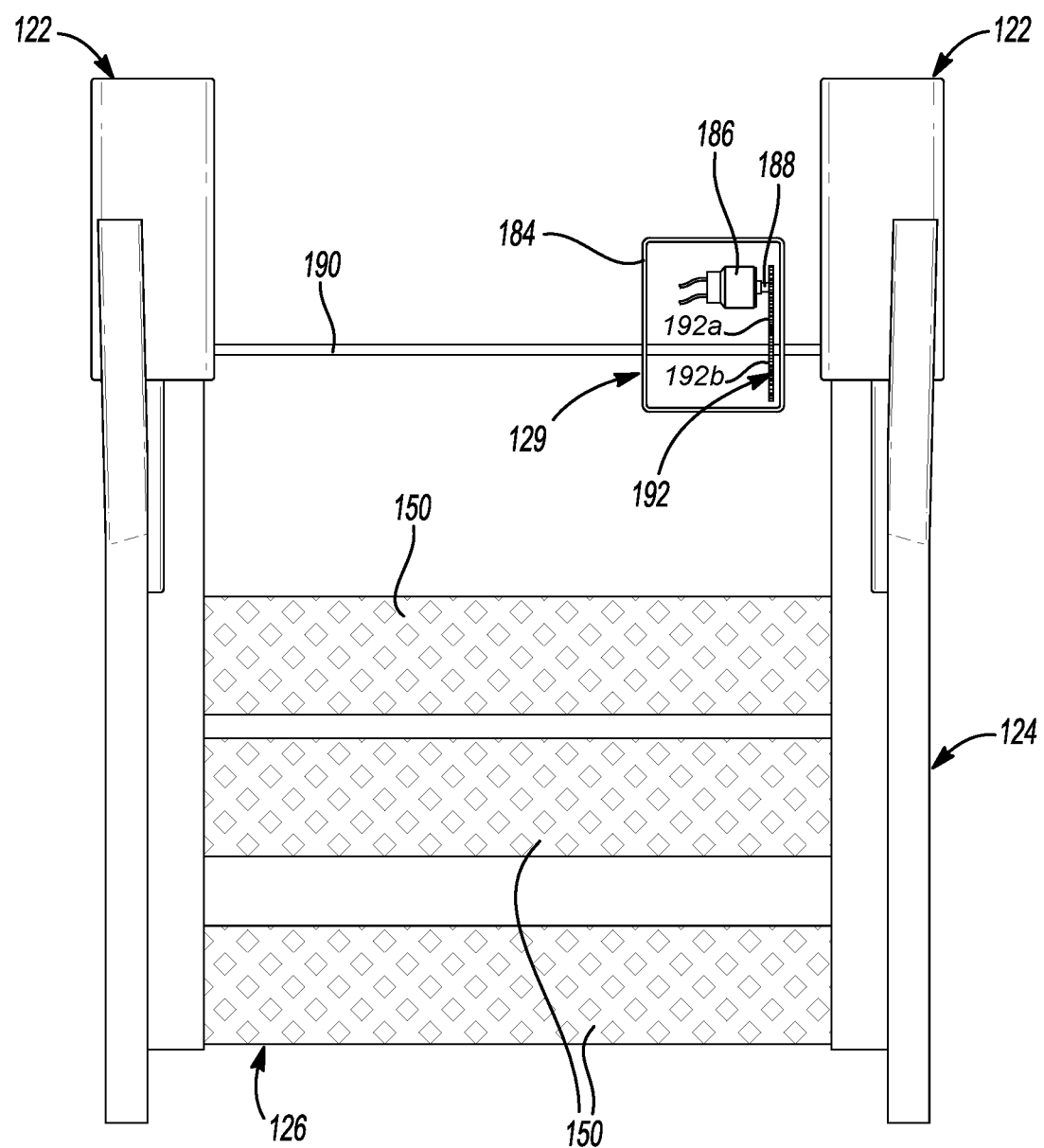
FIG. 4 is a top view of the stair system shown in FIG. 3.
Figure 7:
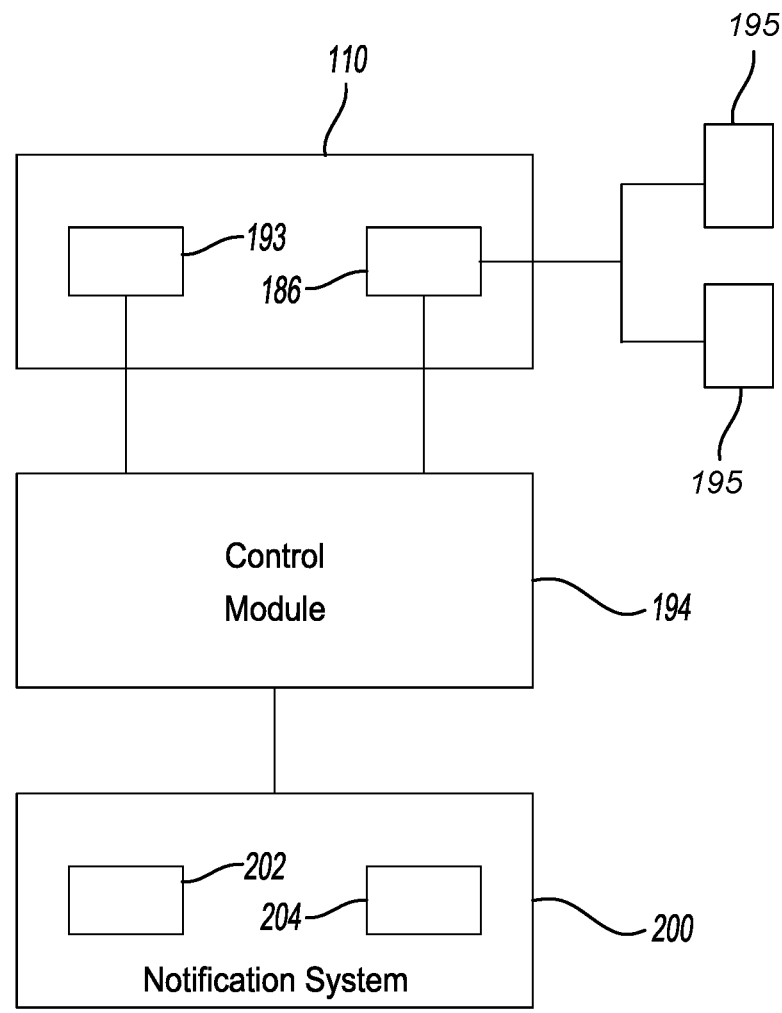
FIG. 7 is a schematic block diagram illustrating communication between a control module, a notification system and the stair system of the present disclosure.

The stair system 110 can optionally include a motor assembly 129 for powering movement of the stair system 110 between the stowed and deployed configurations. The motor assembly 129 may be operatively coupled to the stair assembly 126 to drive (e.g., rotate) the stair assembly 126 between deployed and stowed conditions, which correspondingly drives the handle assembly 124 between deployed and stowed conditions. With particular reference to FIGS. 1, 4 and 7, the motor assembly 129 can include a motor housing 184, a motor 186, a rotatable motor shaft 188 (FIG. 4; e.g., a drive shaft) driven directly by the motor, a gear drive mechanism 192 (FIG. 4, e.g., a torque amplifying gear set comprising a drive gear or pinion gear 192a and a driven gear or reduction gear 192b) operatively coupled to the motor shaft 188, a rotatable output shaft 190 (FIG. 4) operatively coupled to and driven by the driven gear 192b of the gear drive mechanism 192, one or more sensors 193 (FIG. 7) and a controller 194 (FIG. 7). The motor housing 184 may house the motor 186, the motor shaft 188, the gear drive mechanism 192, and may partially house the output shaft 190. The output shaft 190 is rotatably supported (e.g., journaled) by the mounting brackets 122 and the motor housing 184. In some configurations, the motor housing 184 may be coupled to one of the mounting brackets 122.

The motor shaft 188 may be operatively connected to the motor 186 and the pinion gear 192a of the gear mechanism 192 such that operation of the motor 186 causes the motor shaft 188 to rotatably drive the gear mechanism 192. The drive gear 192b of the gear mechanism 192 rotatably drives the output shaft 190. Opposing ends 197 (FIG. 2) of the drive shaft 190 are connected to the stair assembly 126 at second pivot locations 123. Thus, rotation of the output shaft 190 rotates the stair assembly 126 about the pivot locations 123. That is, opposing ends 197 of the drive shaft 190 extend through apertures 198 of respective mounting brackets 122 and fixedly engage respective connecting members 157 of the stair assembly 124. In this way, rotation of the drive shaft 190 rotates the stair assembly 126 between the stowed configuration and the deployed configuration, which in turn rotates the handle assembly 124 (via pins 183) between the stowed configuration and the deployed configuration.

The sensors 193 (e.g., infrared (IR) sensors, microwave sensors or any other suitable sensors) are in communication with the controller 194 and may be attached at various locations on the stair system 110. For example, the sensors 193 can be attached to one or more of the mounting brackets 122, the stair assembly 126, the handle assembly 124 and/or the motor housing 184. The sensors 193 may be proximity sensors and configured to detect objects (e.g., a pole, a curb, a building, etc.) that are in the path of the stair system 110 as the stair system 110 moves between the stowed and deployed configurations. In this way, if the sensors 193 detect an object in the path of the stair system 110, the sensors 193 may send a signal to the controller 194.

The controller 194 may be operable to supply and/or interrupt power to the motor 186 in response to input signal from the sensors 193 to thereby control movement of the stair system 110 between the deployed and stowed configurations. For example, the controller 194 may interrupt power to the motor 186 and prevent continued movement of the stair system 110 between the deployed and stowed configurations if the controller 194 receives a signal from the sensors 193 indicating an object has been detected in the path of movement of the stair system 110. Upon removing the object from the path of movement, the controller 194 can restore power to the motor 186 and allow movement of the stair system 110 to continue.

The motor 186 may be electrically coupled to a first actuator 191 (e.g., a toggle, a switch, a button, or the like) accessible by a user/operator (e.g., disposed inside the cab 114). A second actuator 195 may also be included and disposed outside the cab 114 (e.g., near a location of the stair system 110), instead of, or in addition to, the first actuator 191 located inside the cab 114. For example, the actuators 191, 195 may, for example, be 3-position toggle switches. In a first position, the actuators 191, 195 may enable operation of the motor 186 to deploy the stair system 110 (e.g., powering the motor 186 ON to drive the motor shaft 188 in a clockwise direction), in a second position the actuators 191, 195 may enable operation of the motor 186 to stow the stair system 110 (e.g., powering the motor 186 ON to drive the motor shaft 188 in a counter-clockwise direction), and in a third position the actuators 191, 195 may disable operation of the motor 186 (e.g., to power the motor 186 OFF).

The notification system 200 could be a computer, a mobile phone (e.g., smartphone), or a tablet, for example, or any other communication device or network of devices. The controller 194 may be in communication with the notification system 200 via, for example, an internet, Wi-Fi, Bluetooth®, Zigbee®, power-line carrier communication (PLCC), or cellular connection or any other wired or wireless communication protocol. The notification system 200 may enable the user/operator to interact with and/or receive communications from the controller 194. For example, the notification system 200 may provide notifications to the user/operator regarding the status of the stair system 110 (e.g., whether it is deployed, stowed or if an object has prevented the stair system 110 from being fully deployed or fully stowed). The notification system 200 may include a visual indicator 202 (e.g., flashing red lights) and/or an audio indicator 204 (e.g., audible alarm) that may conveniently notify the user of communications from the notification system 200 (e.g., that power to the motor 186 has been interrupted because an object is in the path of movement of the stair system 110.

Deploying and stowing the stair system 10 can be understood with reference to FIGS. 1, 5, 6, 8 and 9. FIGS. 5 and 6 show a flatbed truck 112 having a cargo platform 116 and incorporating a stair system 110 according to the present disclosure. In FIG. 5 the stair system 110 is in a deployed configuration and enabling easy and safe access to the cargo platform 116. In FIG. 6 the stair system 110 is in a stowed configuration allowing the vehicle 112 to be "road-ready."

As seen in FIGS. 1 and 5, when the stair system 110 is in the deployed configuration, the stair assembly 126 may extend downwardly and away from the cargo platform 116 toward a ground surface. The handle assembly 124 may be positioned above the stair assembly 126 adjacent to the lateral sides of the stair assembly 126 and may extend over the cargo platform 116 of the vehicle 112. When the stair system 110 is in the stowed configuration, the stair assembly 126 may extend generally parallel to the cargo platform 116 and may be positioned adjacent to the underside 119 of the cargo platform 116. In the stowed configuration, the stair system 110 preferably does not extend outboard of the side rail 118 and is sufficiently near the underside 119 of the cargo platform 116 to provide adequate ground clearance for the truck 112 to travel on the road.

Figure 8:
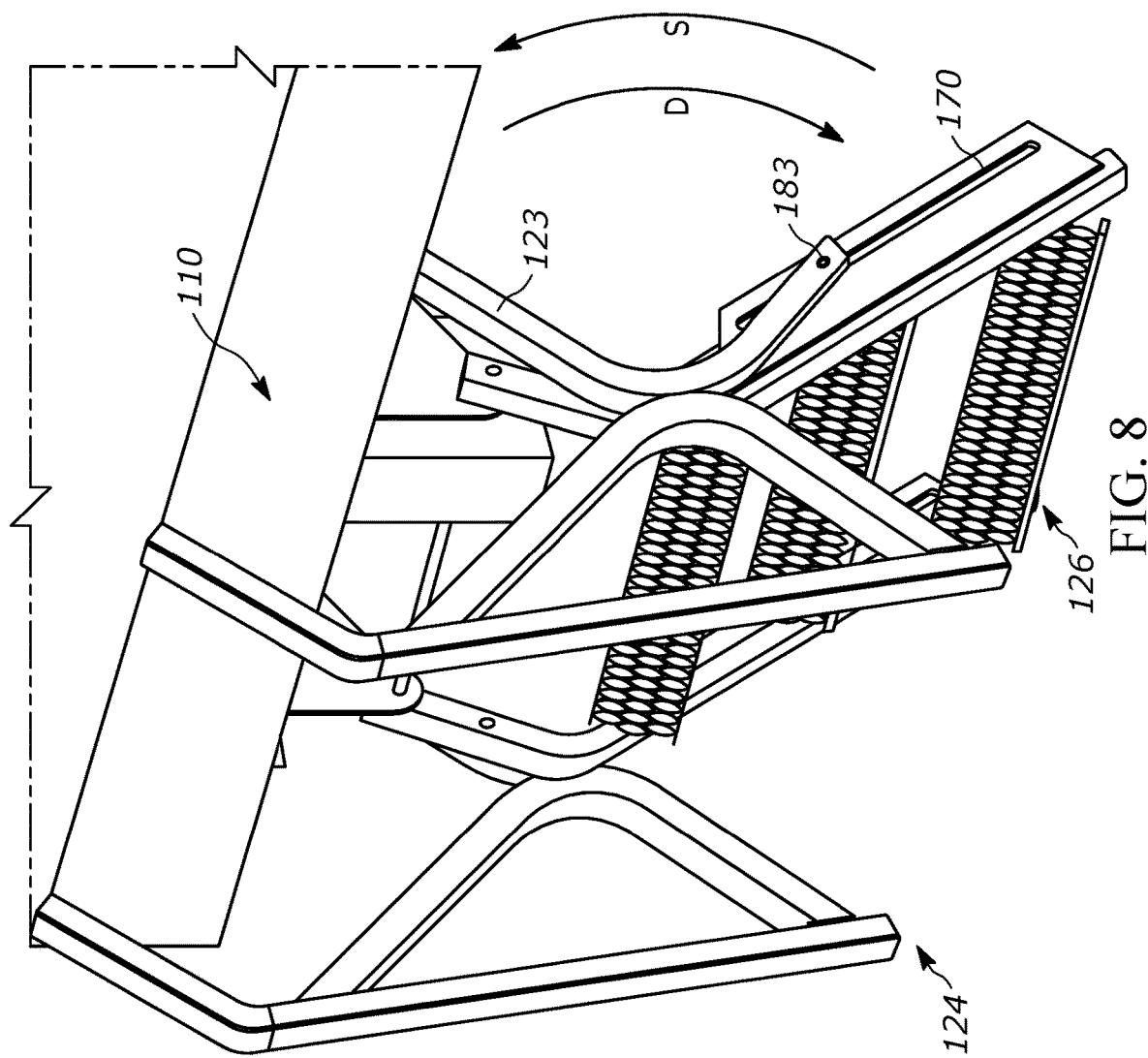
FIGS. 8 and 9 are front-right perspective views of the stair system shown in FIG. 1 moving between the deployed and stowed configurations.
Figure 9:
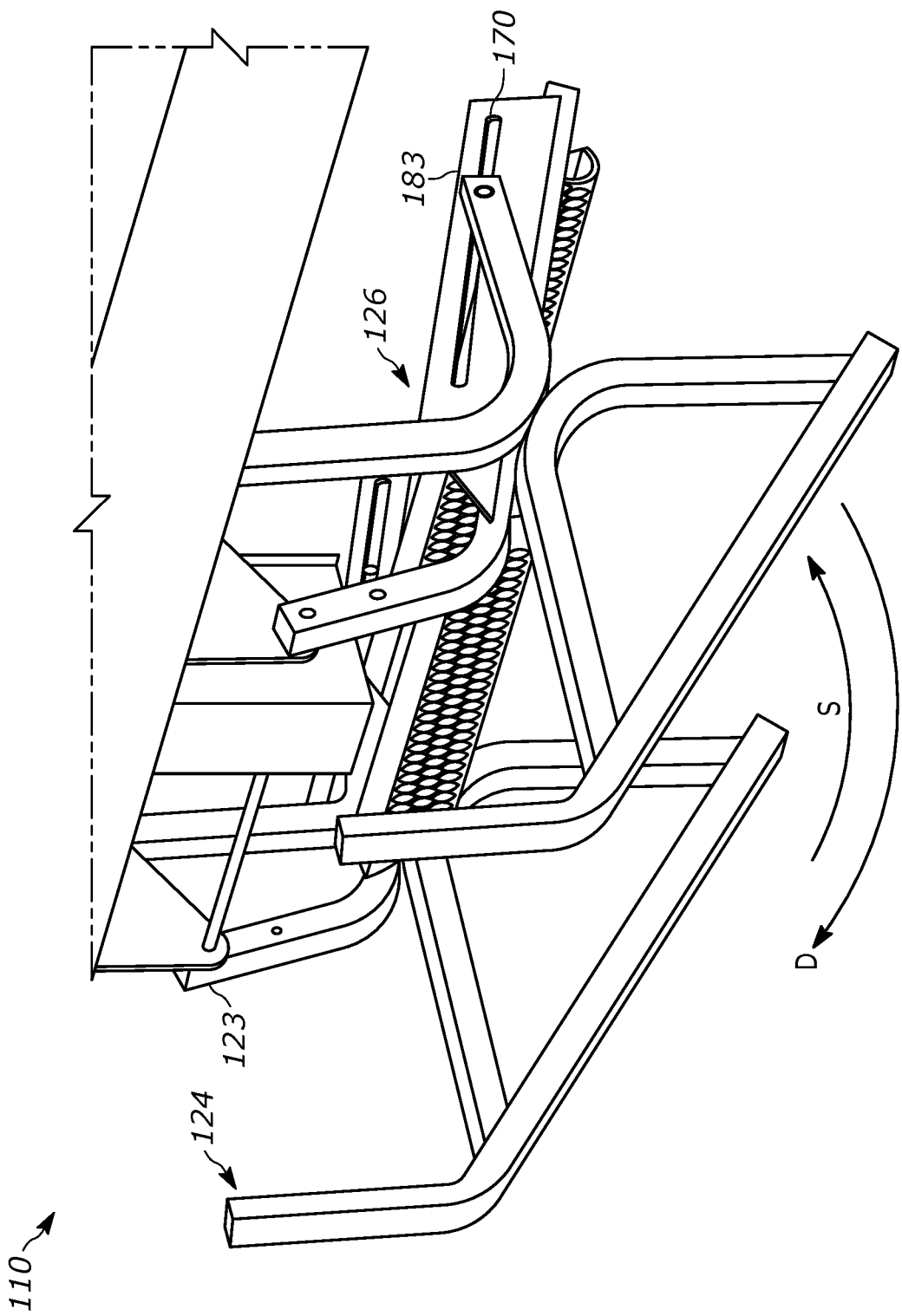
Figure 10:
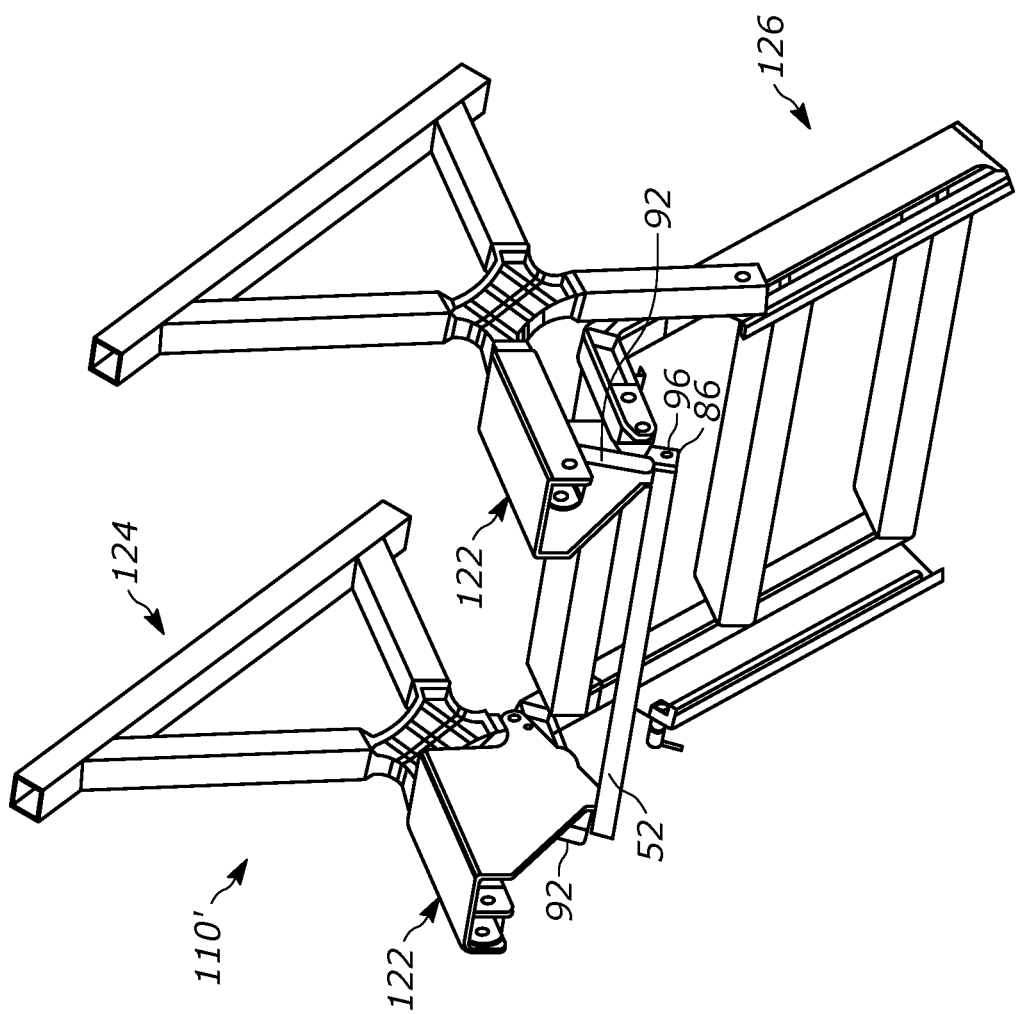
FIG. 10 is a back-left perspective view of another stair system according to the principles of the present disclosure.
Figure 11:
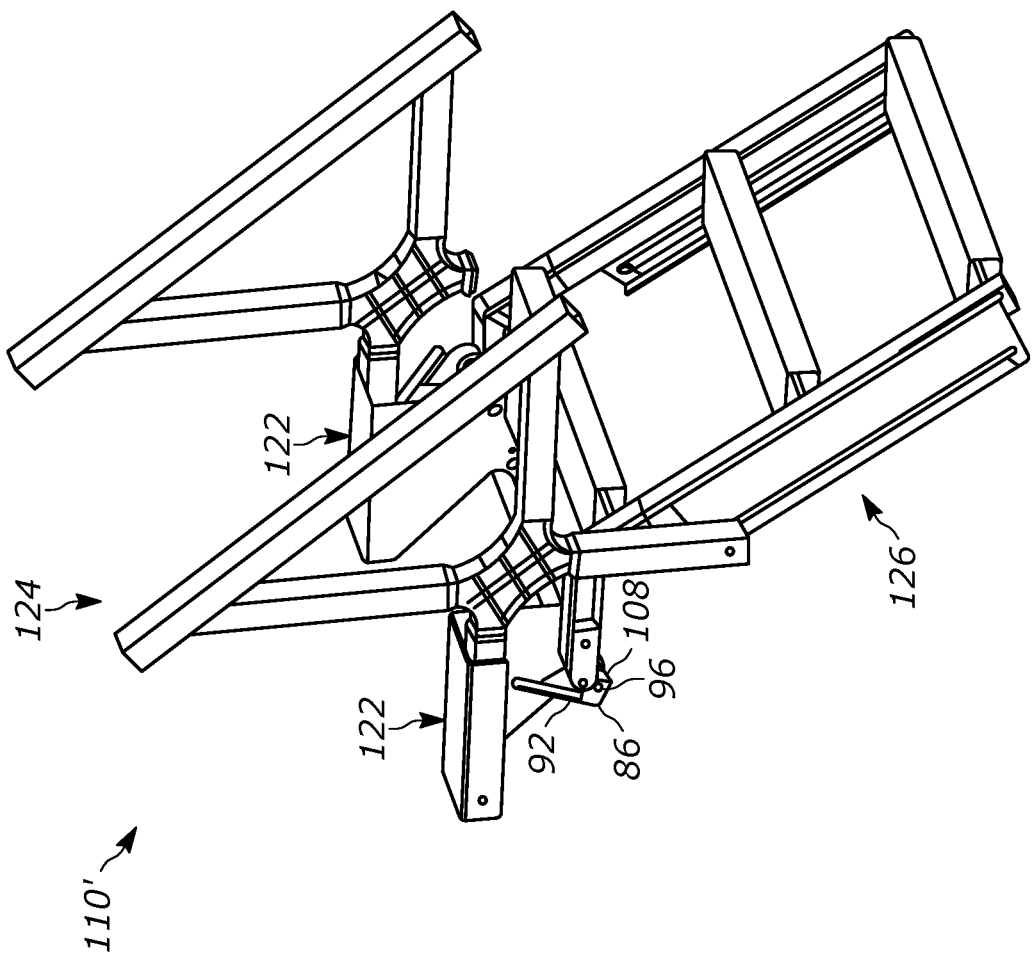
FIG. 11 is a front-left perspective view of the stair system of FIG. 10.

Stowing and deploying the stair system 110 can be understood with reference to FIGS. 8 and 9. Movement of the stair system 110 between the stowed configuration (see arrow S) and deployed configuration (see arrow D) can be initiated by the user/operator and may be accomplished under power or manually. Under powered operation of the stair system 110, the motor 186 rotates the drive shaft 190 (via the motor shaft 188 and gear mechanism 192) so as to rotate or pivot the stair assembly 126 about the pivot locations 123. As the stair assembly 126 rotates, the pins 183 connecting the handle assembly 124 to the stair assembly 126 translate in the slot 170 of the rail plate 156 and cause the handle assembly 124 to correspondingly move with the stair assembly 126 and rotate or pivot about the pivot locations 121. Depending on the direction of rotation of the second shaft 190, the stair system 110 is driven to either the deployed configuration or the stowed configuration. In either case, the stair assembly 126 and the handle assembly 124 of the stair system 110 move concurrently, Optionally, the stair system 110' may not include a motor. Rather, the stair system 110' may be manually operated (i.e., moved between the stowed and deployed configurations) by the user/operator. As shown in FIGS. 10 and 11, the stair assembly 126 may incorporate a connecting bar 52 extending between the mounting plates 122. The connecting bar 52 may include flanges 86 extending from its opposite ends. A pin 96 may extend through a respective flange 86, a respective mounting plate 122 and a respective actuation lever 92, thereby pivotally coupling the connecting bar 52 and the actuation levers 92 to the mounting plates 122.

Each actuation lever 92 may be disposed between a respective flange 86 and a respective mounting plate 122. A biasing member 108, such as a torsion spring, may be disposed on each actuation lever 92 and may bias the actuation lever 92 into a locked position. When the actuation lever 92 is in the locked position, the handle assembly 124 and the stair assembly 126 are prevented from being rotated between the stowed and deployed positions. A user/operator may engage the actuation lever 92 to overcome the bias, thereby moving the actuation lever 92 into an unlocked position. Once unlocked, the handle assembly 124 and stair assembly 126 are free to rotate.

Each actuation lever 92 may be coupled to the connecting bar 52 such that when one of the actuation levers 92 is moved into an unlocked position, the connecting bar 52 rotates and causes the other actuation lever 92 to likewise move into an unlocked position. As such, only one of the actuation levers 92 needs to be engaged by the user/operator in order to operate the stair system 110'.

Figure 12:
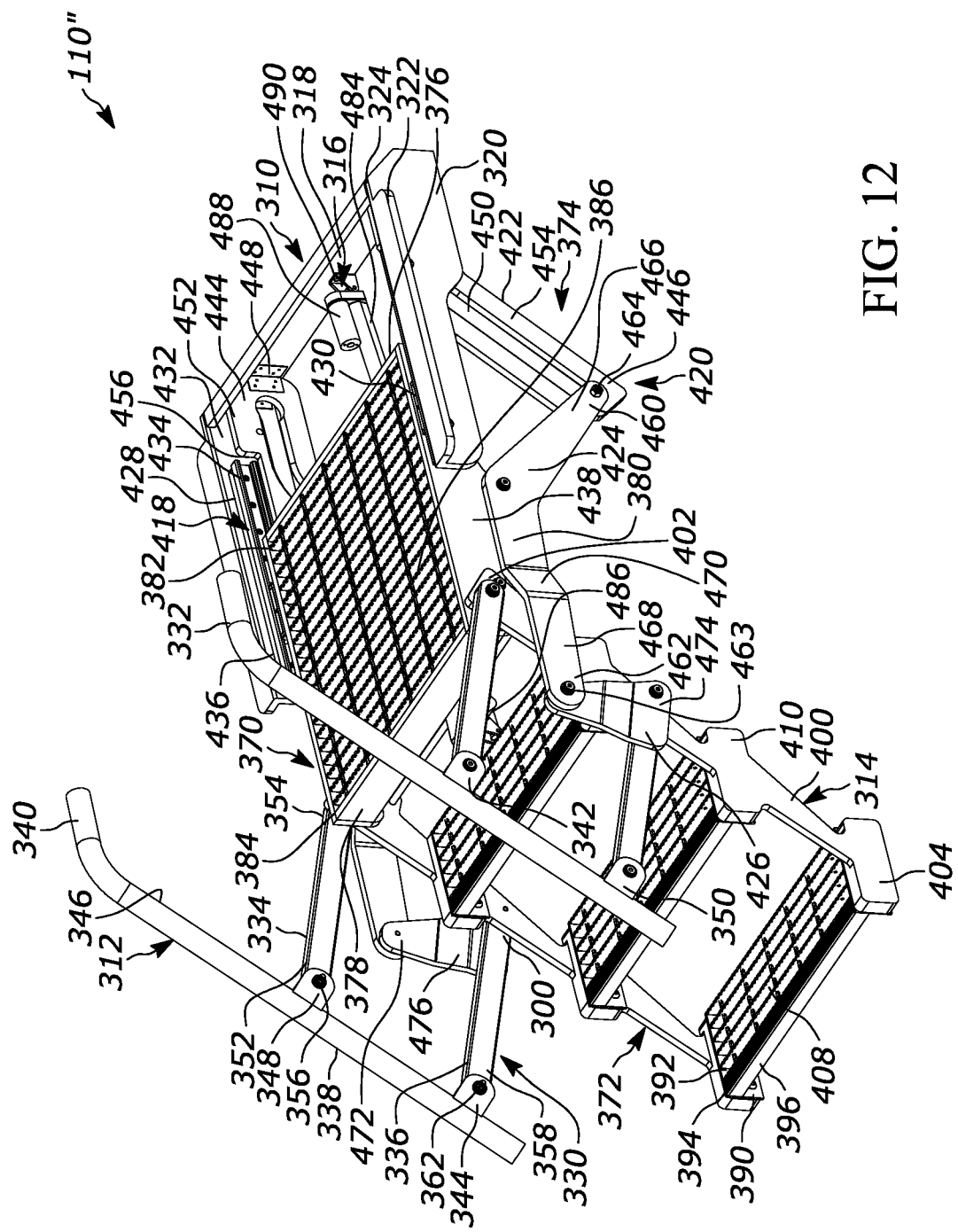
FIG. 12 is a front-right perspective view of yet another stair system according to the present disclosure and showing the stair system in a deployed configuration.
Figure 13:
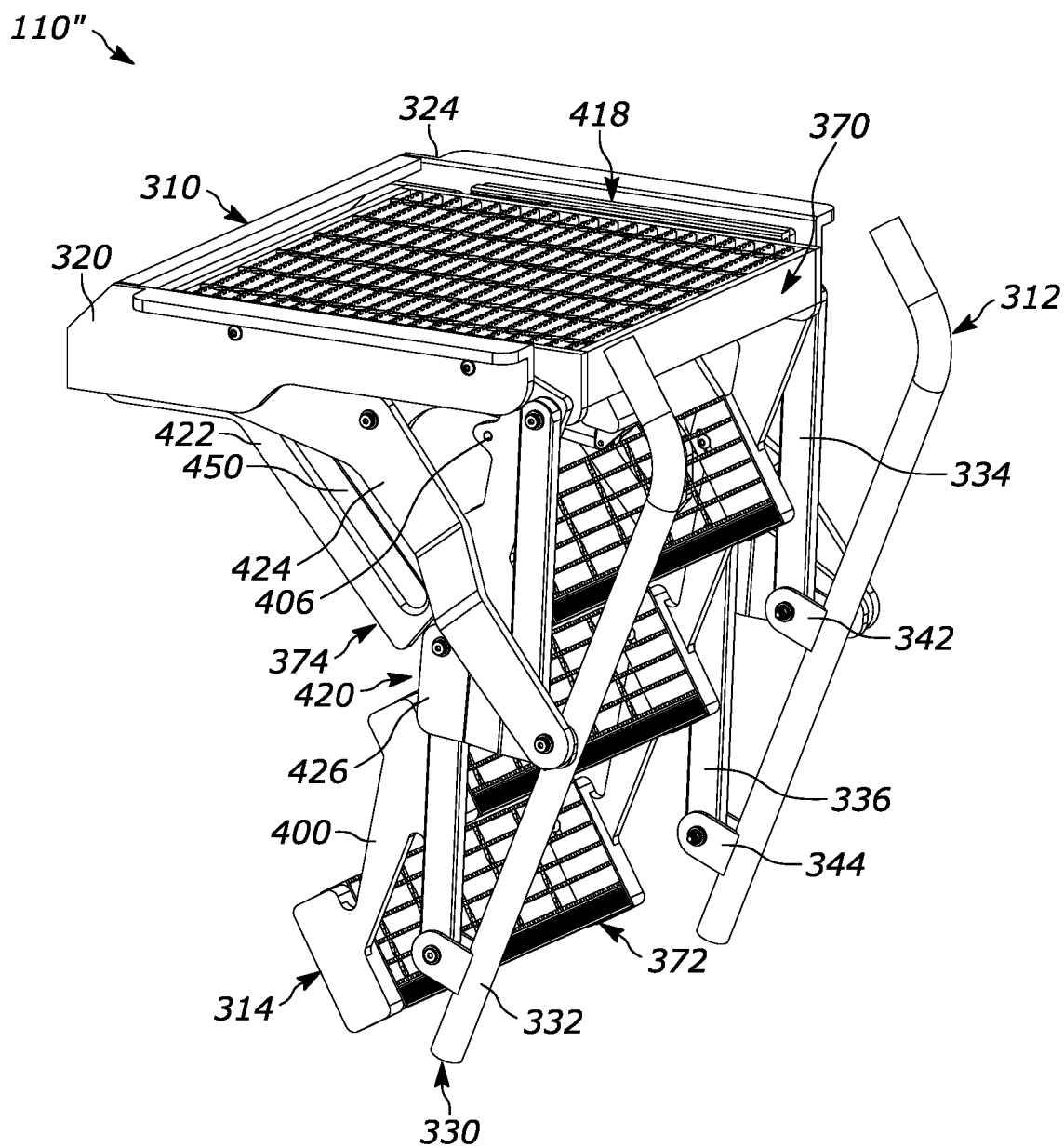
FIG. 13 is a front-left perspective view of the stair system of FIG. 12 and showing the stair system in a stowed configuration.
Figure 14:
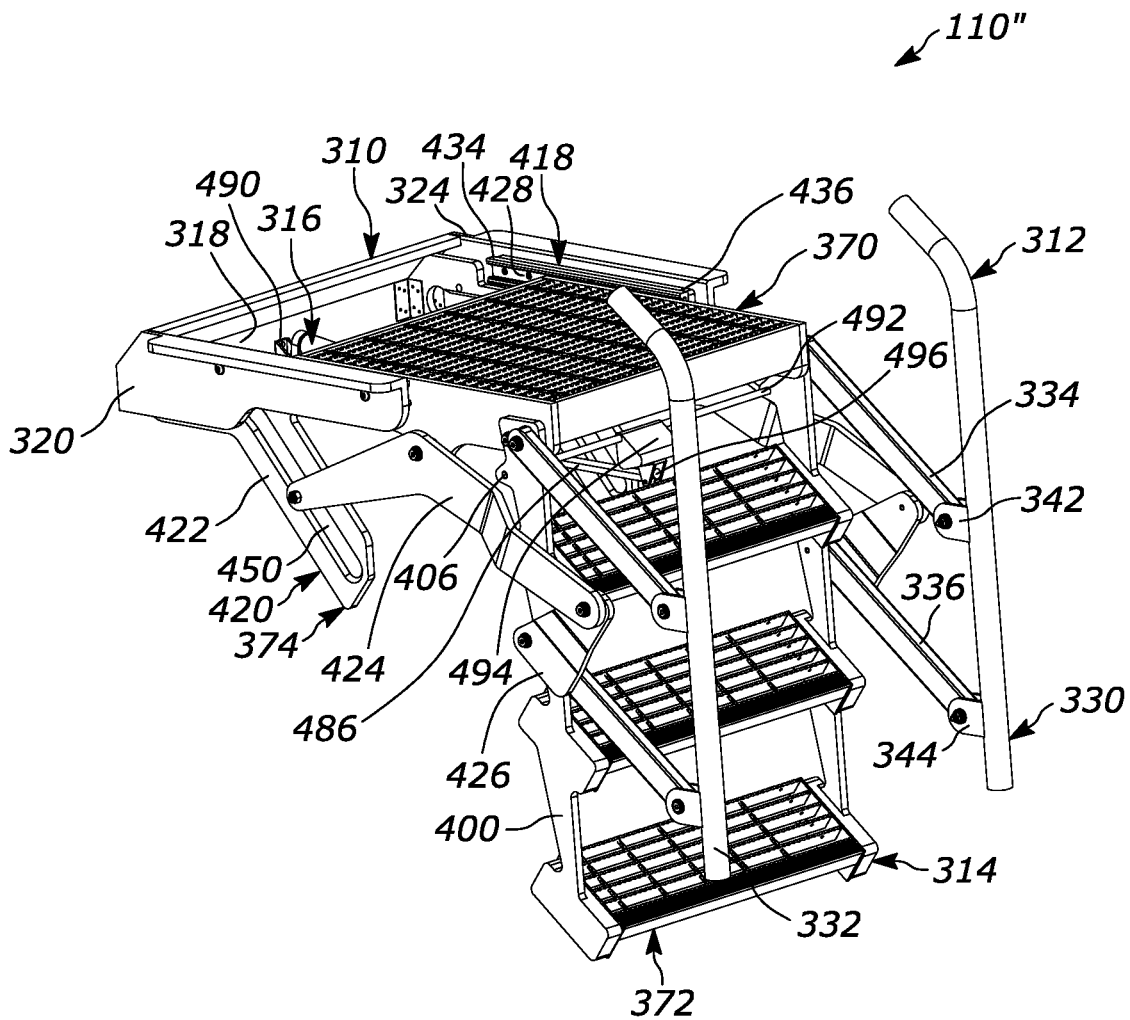
FIG. 14 is a front-left perspective view of the stair system of FIG. 12 and showing the stair system in an intermediate configuration between the deployed configuration and the stowed configuration.

With reference to FIGS. 12-14, another stair system 110" according to the present disclosure is described. Like the stair system 110, the stair system 110" can be integrated with the cargo platform 116 of the vehicle 112. The stair system 110" can be attached to the vehicle 112 and/or the cargo platform 116 and provides the user/operator with easy and safe access to the cargo platform 116. More specifically, the stair system 110" may be attached to the underside or lower surface 119 of the cargo platform 116 and/or at one of the side rails or sides 118. Additionally, the stair system 110" can be arranged in a deployed configuration (FIG. 12) when in use and in a stowed configuration (FIG. 13) that is road ready. The stair system 110" may move through a plurality of intermediate configurations between the deployed and stowed configurations. An example of one intermediary position is shown in FIG. 14.

The stair system 110" may include a mounting plate 310, a handle assembly 312, a stair assembly 314 and a linear actuator 316 (best seen in FIG. 12).

The mounting plate 310 includes a backwall 318 and a pair of mounting sidewalls 320. The pair of mounting sidewalls 320 may extend from opposing ends of the backwall 318 to substantially form a U-shape. Each mounting sidewall 320 includes a flange 322 that is positioned at a top end 324 of the mounting sidewalls 320 and the flange 322 extends in an outboard direction. Mechanical fasteners (not shown) may extend through or over the flange 322 to mount the stair system 110" to the underside 119 of the cargo platform 116 and/or to the side 118 of the cargo platform 116.

The handle assembly 312 includes a pair of handles 330 and may be made of a metal material, polymer material, or any other suitable material. Each handle 330 may include a handrail 332, a first connecting bar 334, and a second connecting bar 336. In the illustrated example, the handrail 332 includes an inclined portion 338 and a horizontal portion 340. The inclined portion 338 may extend at an angle relative to the horizontal portion 340. The horizontal portion 340 extends horizontally when the stair system 110" is in the deployed configuration. However, the handrail 332 may be formed in any suitable shape. Additionally, the illustrated handrail 332 is formed to have a circular cross-sectional shape. However, the handrail 332 may be formed to any suitable cross-sectional shape, such as a rectangular or a square shape. The handrail 332 may be made of an aluminum material and formed in a hollow configuration to reduce the weight of the stair system 110".

The user/operator of the stair system 110" can conveniently and naturally grasp the incline portion 338 of the handrail 332 as the user ascends or descends the stair system 110" and the horizontal portion 340 as the user steps to and from the stair assembly 314 onto and off of the cargo platform 116 when the stair system 110" is in the deployed configuration.

A first connector 342 and a second connector 344 may be attached to each handrail 332. More specifically, the first and second connectors 342, 344 may be disposed on a bottom side 346 of the handrail 332. The first and second connectors 342, 344 are spaced apart from each other along the incline portion 338 of the handrail 332. Each of the first and second connectors 342, 344 may include a first arm 348 and a second arm 350 that extend from the handrail 332 in a parallel direction. In the illustrated example, the first and second connectors 342, 344 are welded to handrail 332. However, the first and second connectors 342, 344 may be fixed to the handrail 332 using any suitable fastening technique.

The first connecting bar 334 extends between a first bar end 352 and a second bar end 354 that opposes the first bar end 352. The first bar end 352 is received within the first connector 342 and more specifically, positioned between the first and second arms 348, 350 of the first connector 342. A first mechanical fastener 356 extends through the first arm 348 of the first connector 342, the first bar end 352 of the first connecting bar 334 and the second arm 350 of the first connector 342 to secure the first connecting bar 334 to the handrail 332. The first bar end 352 is rotatable relative to the first connector 342. Additionally, the second bar end 354 is rotatably or pivotally attached to the stair assembly 314.

The second connecting bar 336 extends between a third bar end 358 and a fourth bar end 360 that opposes the third bar end 358. The third bar end 358 is received within the second connector 344 and more specifically, positioned between the first and second arms 348, 350 of the second connector 344. A second mechanical fastener 362 extends through the first arm 348 of the second connector 344, the third bar end 358 of the second connecting bar 336 and the second arm 350 of the second connector 344 to secure the second connecting bar 336 to the handrail 332. The third bar end 358 is rotatable relative to the second connector 344. Additionally, the fourth bar end 360 is rotatably or pivotally attached to the stair assembly 314. In some configurations, the first and second connecting bars 334, 336 may be directly attached to the handrail 332 and rotate or pivot relative to the handrail 332.

The stair assembly 314 may include a top platform 370, a plurality of step platforms 372, and a rail mechanism 374. The stair assembly 314 may be made of a metal material or any other suitable material. The top platform 370 includes a first wall 376, a second wall 378 that opposes the first wall 376, and a pair of platform sidewalls 380 that extend between the first and second walls 376, 378. Each platform sidewall 380 may extend between a first sidewall end 382 and a second sidewall end 384. The first wall 376 is positioned at the first sidewall ends 382 of the pair of platform sidewalls 380 and the second wall 378 is positioned at sidewall ends 384 of the pair of platform sidewalls 380. In the illustrated example, grating 386 is disposed between and secured to the first wall, second wall and platform sidewalls 376, 378, 380 and the grating 386 is made of an aluminum material. However, any suitable form of a support surface of any suitable material may be positioned between the first wall, second wall, and platform sidewalls 376, 378, 380 to form the top platform 370.

In the illustrated example, the plurality of step platforms 372 includes three step platforms. However, a greater or lesser quantity of step platforms 372 may be provided. Each step platform 372 includes a pair of step sidewalls 390 and a step surface (e.g., grating 392) disposed between the pair of step sidewalls 390. The grating 392 may be positioned substantially perpendicular to the step sidewalls 390. Accordingly, each step platform 372 is formed substantially in a U-shape. A step nose 394 (i.e., step edge) may be disposed at a front end 396 of each step platform 372 and may include a surface pattern to promote traction. The step nose 394 extends between the pair of step sidewalls 390 and abuts the grating 392. In the illustrated example, the step nose 394 and the grating 392 are formed as a single component. However, in another example, the step nose 394 and grating 392 may be separate components that are attached together.

The plurality of step platforms 372 is connected using a pair of connecting members 400 (i.e., connecting rails). The pair of connecting members 400 may be made of aluminum sheets or any other suitable material. The pair of connecting members 400 is positioned on opposing lateral sides of the step platforms 372 (i.e., adjacent to the pair of step sidewalls 390). Each connecting member 400 extends between a first member end 402 and a second member end 404 that opposes the first member end 402. The first member end 402 is rotatably or pivotally attached to the second sidewall ends 384 of the pair of platform sidewalls 380 of the top platform 370. The second member end 404 is secured to the bottom-most step platform 408 (i.e., a first step platform). A protrusion 406 (see FIGS. 13-14) extends from the each connecting member 400 and is positioned adjacent to the first member end 402. Additionally, each connecting member 400 includes a plurality of step portions 410 that are attached to the plurality of step platforms 372. Each step portion 410 is shaped and sized to the respective step sidewalls 390. The step portion 410 of the connecting members 400, the step sidewalls 390 and the step nose 394 are flush at the front end 396 of the step platform 372.

The second bar end 354 of the first connecting bar 334 is rotatably or pivotally attached to the first member end 402 of the connecting member 400. The fourth bar end 360 of the second connecting bar 336 is rotatably or pivotally attached to the connecting member 400 at a location between the first and second member ends 402, 404 of the connecting member 400. Accordingly, the first and second connecting bars 334, 336 are spaced apart along the connecting member 400.

The rail mechanism 374 includes a pair of linear slide rails 418, and a linkage assembly 420 including a pair of guide brackets or slotted links 422, a pair of pivot links or first links 424, and a pair of connecting links or second links 426. The pair of slotted links 422, the pair of first links 424 and the pair of second links 426 may be composed of steel, and more specifically, zinc chromate plated steel or zinc chromate galvanized steel. However, any other suitable material may be used. The pair of linear slide rails 418, the pair of slotted links 422, the pair of first links 424, the pair of second links 426 are disposed at opposing lateral sides of the top platform 370 and plurality of step platforms 372 (i.e., adjacent to the platform sidewalls 380 of the top platform 370 and the connecting members 400 of the plurality of step platforms 372).

Each linear slide rail 418 is positioned between the mounting sidewall 320 of the mounting plate 310 and the platform sidewall 380 of the top platform 370. Each linear slide rail 418 includes a guide rail 428 and a block 430. The guide rail 428 is attached to an inboard side 432 of the mounting sidewall 320 of the mounting plate 310. The guide rail 428 extends between a first rail end 434 and a second rail end 436 that opposes the first rail end 434. The first rail end 434 is positioned adjacent to the backwall 318 of the mounting plate 310. The guide rail 428 extends substantially parallel to the platform sidewall 380 of the top platform 370. The block 430 is attached to an outboard side 438 of the platform sidewall 380 of the top platform 370. The block 430 is received within the guide rail 428 and slidable along the guide rail 428 between the first and second rail ends 434, 436. More specifically, the block 430 is positioned near the first rail end 434 of the guide rail 428 when the stair system 110" is in the stowed configuration. The block 430 is positioned near the second rail end 436 of the guide rail 428 when the stair system 110" is in the deployed configuration.

Each slotted link 422 is positioned laterally between the guide rail 428 and the platform sidewall 380 of the top platform 370. Each slotted link 422 extends between a first link end 444 and a second link end 446 that opposes the first link end 444. The first link end 444 is secured to the backwall 318 of the mounting plate 310 using an angled bracket 448. A slot 450 extends through the slotted link 422 and extends between the first and second link ends 444, 446. The slotted link 422 and thereby, the slot 450, includes a first portion 452 that is positioned near the first link end 444 and a second portion 454 that is positioned near the second link end 446. The first portion 452 may extend in a substantially horizontal direction and the second portion 454 may extend at an incline. In other words, the second portion 454 may extend at an angle relative to the first portion 452. Additionally, the slotted link 422 includes a recess 456 positioned near the guide rail 428 of the linear slide rail 418. The recess 456 is configured to receive the block 430 of the linear slide rail 418 as the block 430 slides toward the first rail end 434 of the guide rail 428.

Each first link 424 extends between a third link end 460 and a fourth link end 462 that opposes the third link end 460. The third link end 460 is coupled to the slotted link 422 and the fourth link end 462 is rotatably or pivotally attached to the second link 426 at a pivot location 463. A slider 464 is attached to the third link end 460 and is received within the slot 450 of the slotted link 422. The slider 464 is configured to slide within the slot 450 of the slotted link 422 between the first and second link ends 444, 446 and thereby, enables movement of the first link 424 relative to the slot 450. More specifically, the third link end 460 of the first link 424 is positioned at the first link end 444 of the slotted link 422 when the stair system 110" is in the stowed configuration. The third link end 460 of the first link 424 is positioned at the second link end 446 of the slotted link 422 when the stair system 110" is in the deployed position.

The first link 424 includes a third portion 466 that is positioned near the third link end 460 and a fourth portion 468 that is positioned near the fourth link end 462. The fourth portion 468 is positioned at an angle relative to the third portion 466. The first link 424 is rotatably or pivotally attached to the platform sidewall 380 of the top platform 370 at an intersection point between the third and fourth portions 466, 468. Furthermore, the fourth portion 468 of the first link 424 may include a first bend 470 that extends in an outboard direction. The first bend 470 creates access space for the connecting member 400 and the first connecting bar 334, as the stair system 110" moves between the stowed and deployed configurations.

Each second link 426 extends between a fifth link end 472 and a sixth link end 474 that opposes the fifth link end 472. The fifth link end 472 is rotatably or pivotally attached to the fourth link end 462 of the first link 424 at the pivot location 463. The sixth link end 474 is fixedly attached to the fourth bar end 360 of the second connecting bar 336 and rotatably or pivotally attached to the connecting member 400. The second link 426 may include a second bend 476 that extends in an inboard direction. In the illustrated example, the second link 426 is formed substantially in a triangular shape. However, the second link 426 may be formed in any suitable shape, such as a square or rectangular shape.

The linear actuator 316 may be rated for IP66. The linear actuator 316 includes a housing 484, a rod 486, and a motor 488. The housing 484 of the linear actuator 316 is fixedly attached to the backwall 318 of the mounting plate 310 using a first bracket 490. The housing 484 and the first bracket 490 can be positioned equidistantly between the pair of mounting sidewalls 320 of the mounting plate 310. The rod 486 is slidably received within the housing 484 and is configured to extend out of the housing 484 during an extension stroke and retract into the housing 484 during a compression stroke. The motor 488 is attached to the housing 484 and positioned adjacent to the backwall 318 of the mounting plate 310. A support rod 492 (see FIG. 14) extends between the connecting members 400 and more specifically, is received within the protrusions 406 of the connecting members 400. The support rod 492 extends through a support block 494 such that the support block 494 can rotate or pivot relative to the support rod 492. The support block 494 is positioned equidistantly between the connecting members 400. A second bracket 496 is fixedly attached to the support block 494 and receives the rod 486. Accordingly, the rod 486 is received within the housing 484 and attached to the second bracket 496 at opposing ends.

In FIG. 12, the stair system 110" is in the deployed configuration, enabling safe and easy access to the cargo platform 116 of the vehicle 112. The stair system 110" is configured to extend outwardly from the side 118 of the cargo platform 116 of the vehicle 112 in the deployed configuration. In FIG. 13, the stair system 110" is in the stowed configuration, allowing the vehicle 112 to be "road-ready." The stair system 110" is configured to be positioned beneath the cargo platform 116 of the vehicle 112 in the stowed configuration.

The linear actuator 316 powers movement of the stair system 110" between the stowed and deployed configurations. More specifically, the motor 488 may slidably move the rod 486 relative to the housing 484 of the linear actuator 316. Movement of the rod 486 drives the connecting members 400 to move and concurrently, drives the top platform 370 to correspondingly move along the linear slide rails 418. Because the top platform 370 is attached to the pair of first links 424, movement of the top platform 370 causes the third link ends 460 of the pair of first links 424 to move along the slots 450 of the pair of slotted links 422 and the fourth link ends 462 of the pair of first links 424 to rotate relative to the top platform 370. Rotation of the fourth link ends 462 of the pair of first links 424 at the pivot location 463 correspondingly rotates the pair of second links 426, and rotation of the pair of second links 426 causes the second connecting bars 336 of the pair of handles 330 to rotate. As the second connecting bars 336 are attached to the first connecting bars 334 via the handrails 332, rotation of the second connecting bar 336 causes the handrails 332 and the first connecting bars 334 to correspondingly rotate. Depending on the direction of movement of the rod 486 of the linear actuator 316, the stair system 110" is driven to either the deployed configuration or the stowed configuration. In either case, the stair assembly 314 and the handle assembly 312 of the stair system 110" move concurrently.

The stair system 110, 110', 110" of the present disclosure provides a convenient way to access the cargo platform 116 of the vehicle 112. The stair system 110, 110', 110" can include a plurality of handrails to provide three points of contact for the user of the system. The stair system 110, 110', 110" may be stored when not in use deployed when in use without using additional storage space on the cargo platform 116 of the vehicle 112. It should be understood that the stair system 110, 110', 110" may also be employed in vehicles such as in trailers, for example. It should also be understood that a plurality of stair systems 110, 110', 110" may also be employed to provide access to a cargo platform 116 from multiple locations around the vehicle 112.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A stair system attached to a cargo platform of a vehicle and movable between a deployed configuration providing access to a storage area of the cargo platform and a road-ready stowed configuration, the stair system comprising:
   a mounting plate configured to be attached to the cargo platform of the vehicle, the mounting plate including a backwall and a pair of sidewalls that extend from the backwall;
   a stair assembly including a top platform slidably received within the mounting plate and a plurality of step platforms pivotally attached to the top platform;
   a pair of handles pivotally attached to the stair assembly on opposing sides of the stair assembly, wherein each handle including a handrail and a first connecting bar that is attached to the handrail at a first bar end and attached to the stair assembly at a second bar end;
   a linkage assembly comprising:
      a pair of slotted links attached to the backwall of the mounting plate, each slotted link includes a slot that extends between a first link end and a second link end;
      a pair of first links disposed on opposing sides of the stair assembly, each first link includes a third link end that is slidable relative to the slot and a fourth link end that is pivotally attached to the stair assembly;
   wherein, when in the road-ready stowed configuration, the stair system is configured to be positioned beneath the cargo platform; and
   wherein, when in the deployed configuration, the stair system is configured to extend outwardly from a side of the cargo platform.

2. The stair system of claim 1, wherein the first link end of the slot is positioned adjacent to the backwall of the mounting plate.

3. The stair system of claim 2, wherein the first link is positioned at the first link end of the slot when the stair system is in the stowed configuration.

4. The stair system of claim 2, wherein the first link is positioned at the second link end of the slot when the stair system is in the deployed configuration.

5. The stair system of claim 1, wherein the first link is rotatably attached to the top platform between the third and fourth link ends.

6. The stair system of claim 1, wherein the linkage assembly further comprises:
   a pair of second links disposed on opposing sides of the stair assembly, wherein each second link extends between a fifth link end that is pivotally attached to the fourth link end of the first link and a sixth link end that is pivotally attached to the stair assembly.

7. The stair system of claim 6, wherein each handle includes a second connecting bar that is pivotally attached to the handrail at a third bar end and pivotally attached to the stair assembly at a fourth bar end, wherein the second connecting bar is spaced from the first connecting bar.

8. The stair system of claim 7, wherein the sixth link end of the second link is fixedly attached to the fourth bar end of the second connecting bar.

9. The stair system of claim 1, further comprising:
   a linear actuator including a housing, a rod and a motor, wherein the rod is received in the housing and the motor drives the rod to slidably move relative to the housing.

10. The stair system of claim 9, wherein the housing is attached to the backwall of the mounting plate and the rod is attached to the stair assembly.

11. The stair system of claim 10, wherein when the rod extends relative to the housing, the stair system moves into the deployed configuration and when the rod retracts relative to the housing, the stair system moves into the stowed configuration.

12. A stair system for providing access to a cargo platform of a commercial vehicle, the stair system movable between a stowed configuration and a deployed configuration, the stair system comprising:
   at least one mounting bracket configured to be attached to the cargo platform of the vehicle;
   a stair assembly pivotally attached to the at least one mounting bracket at a first pivot location, the stair assembly comprising a first support frame comprising a pair of opposing frame rails and a plurality of step platforms secured to the frame rails of the first support frame, wherein at least one frame rail comprises a side plate comprising an elongated slot extending along a length of the side plate;
   a handle assembly pivotally attached to the at least one mounting bracket at a second pivot location and pivotally and slidably attached to the side plate of the at least one frame rail of the stair assembly, the handle assembly comprising at least one hand rail having a lower end and an upper end, and at least one second support frame connected to the at least one hand rail;
   at least one pin coupling the at least one second support frame to the at least one frame rail of the stair assembly, the at least one pin at least partially disposed in the elongated slot of the side plate of the at least one frame rail, wherein the pin is operable to travel along the elongated slot of the side plate of the at least one frame rail and both the stair assembly and the handle assembly are operable to rotate about the pin;
   a motor assembly operable to drive the stair system between the stowed configuration and the deployed configuration under power; and
   a controller in electrical communication with the motor assembly and operable to both enable power and interrupt power to the motor assembly.

13. A commercial vehicle comprising the stair system of claim 12, wherein the at least one mounting bracket of the stair system is attached to an underside of the cargo platform of the vehicle.

14. A stair system for providing access to a cargo platform of a commercial vehicle, the stair system movable between a deployed configuration and a stowed configuration, the stair system comprising:
   a mounting plate attachable beneath the cargo platform of the commercial vehicle;
   a stair assembly attached to the mounting plate, the stair assembly being both slidable and pivotable relative to the mounting plate;
   a handle assembly pivotally attached to the stair assembly; and
   an actuator attached to the mounting plate and the stair assembly;
   wherein the mounting plate comprises a backwall and a pair of opposing sidewalls that extend forward from the backwall;
   wherein a slide rail is attached at an inner side of each of the sidewalls;
   wherein the stair assembly comprises a horizontal top platform, a pair of linear slide rails attach to opposing first and second sidewalls of the top platform, and a plurality of step platforms pivotally attached to the top platform by a linkage assembly;

wherein the linkage assembly comprises a first link pivotally attached to one of the first and second sidewalls of the top platform, and a second link pivotally attached at a first end to the first link, pivotally attached at a second end to the plurality of step platforms, and fixedly attached at the second end to the handle assembly;

wherein, when in the stowed configuration, the stair system is configured to be positioned beneath the cargo platform; and wherein, when in the deployed configuration, the stair system is configured to extend outwardly from a side of the cargo platform.

15. A commercial vehicle comprising:
a passenger cab;
a cargo platform located rear of the passenger cab, the cargo platform comprising an upper side, an underside, a side rail and a cargo storage area; and
a stair system of claim 14.

16. The stair system of claim 14, wherein:
the handle assembly comprises at least one handle pivotally attached to the stair assembly on one lateral side of the stair assembly, wherein the handle includes a handrail and a first connecting bar that is pivotally attached to the handrail at a first bar end and pivotally attached to the stair assembly at a second bar end.

17. The stair system of claim 16, wherein when the stair system moves between the stowed configuration and the deployed configuration, the stair assembly and the at least one handle move concurrently.

18. The stair system of claim 16, wherein the handle further includes a second connecting bar that is pivotally attached to the handrail at a third bar end and pivotally attached to the stair assembly at a fourth bar end, the second connecting bar is spaced from the first connecting bar.

19. The stair system of claim 16, wherein the stair assembly includes at least one connecting member disposed on one lateral side of the plurality of step platforms.

20. The stair system of claim 19, wherein the connecting member extends between a first member end and a second member end that opposes the first member end, the connecting member is pivotally attached to the top platform at the first member end.

21. The stair system of claim 20, wherein the second bar end of the first connecting bar of the handle is pivotally attached to the connecting member at the first member end.

22. The stair system of claim 16, wherein:
the linkage assembly further comprises:
a slotted links attached to one of the pair of sidewalls of the mounting plate; and
wherein a third end of the first link comprises a slider that is received within a slot of the slotted link and is slidable within the slot.

* * * * *

UNITED STATES PATENT AND TRADEMARK OFFICE
CERTIFICATE OF CORRECTION

Page 1 of 1

PATENT NO. : 12,233,818 B2
APPLICATION NO. : 18/081182
DATED : February 25, 2025
INVENTOR(S) : Deepak Kapur et al.

It is certified that error appears in the above-identified patent and that said Letters Patent is hereby corrected as shown below:

In the Claims

Column 18,
Claim number 22, Line 24 delete "links" and insert --link-- therefor

Signed and Sealed this
Sixth Day of May, 2025

Coke Morgan Stewart
*Acting Director of the United States Patent and Trademark Office*